3,290,312
TRIAMINO PTERIDINE COMPOUNDS
Rudolf Tschesche, Rottgen, near Bonn, and Gerhard Sturm, Ippendorf, near Bonn, Germany, assignors, by mesne assignments, to E. R. Squibb & Sons, Inc., New York, N.Y., a corporation of Delaware
No Drawing. Filed Sept. 26, 1963, Ser. No. 311,654
9 Claims. (Cl. 260—251.5)

This invention relates to new 2,4,7-triamino-6-$R_1$-pteridines of the following structural formula (I)
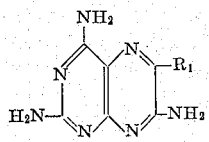

$R_1$ in Formula I represents pyridyl, lower alkylpyridyl, thiazolyl and lower alkylthiazolyl. The lower alkyl groups on either of the heterocyclic rings include for example methyl, ethyl, propyl, isopropyl and the like, and the lower alkyl groups may be attached to any carbon atom of the heterocyclic ring. The methyl group is, however, preferred and is preferably attached to the pyridyl ring ortho to the nitrogen and in the thiazolyl ring in the 2-position i.e., adjacent to both the nitrogen and sulfur atoms.

The acid addition salts of the foregoing compounds are also within the scope of the invention. The hydrohalic acid salts and the hydrochloric acid and hydrobromic acid salts, in particular, are preferred. Also included are the sulphate, nitrate, citrate, oxalate, and other acid salts of conventional pharmaceutical application.

The new compounds of the invention are produced by reacting 2,4,6-triamino-5-nitrosopyrimidine with an acetonitrile of the formula (II)

$R_1$ in Formula II represents the pyridyl, thiazolyl, lower alkyl pyridyl and lower alkyl thiazolyl groups described above.

The reaction is carried out in an organic solvent such as glycol monoethyl ether, preferably at elevated temperature, in the presence of a basic condensation agent such as sodium or sodium alkoxide. The proportion of sodium: nitroso compound: nitrile is recommended in the range 0.2–0.5:1:1. The product may be isolated from the reaction mixture by conventional solvent extraction methods or by chromatography. One preferred method is to isolate the pteridine compound in the form of an acid salt by treatment with an acid, e.g., hydrochloric acid. Silica gel for example, may be used for chromatographic purification.

The compounds of this invention have diuretic and hypotensive activity. They are, therefore, useful as diuretics and hypotensive agents. The compounds of Formula I or a physiologically acceptable acid addition salt thereof may be administered orally or parentarally in the form of tablets, capsules, elixirs, injectables or the like by incorporating the appropriate dosage of a compound of Formula I or a physiologically acceptable acid addition salt thereof, for example, in an amount of about 5 to 250 mg., in a vehicle conforming to accepted pharmaceutical practice. Solid carriers useful in producing tablets include for example lactose, magnesium stearate, sucrose, talc, gelatin, agar, pectin or the like. Such compositions may also be used in the preparation of hard gelatin capsules or pastilles and the like. Liquid carriers for oral or parenteral use include for example water or vegetable oils such as peanut oil, sesame oil and the like.

The product of this invention may be used alone or in combination with such diuretic and/or hypotensive agents including for example, chlorthiazide, hydrochlorthiazide, flumethiazide, hydroflumethiazide, benzydroflumethiazide and the like. These additional active components may be in combination in dosage units of the type described above. The compounds of this invention provide a particular advantage in producing diuresis and sodium excretion without excess potassium excretion which is characteristic of other diuretics and, in combination with other diuretics, achieves improved diuretic action while at the same time avoiding undue upset of the electrolyte balance. A dosage regimen of about 10 to 500 mg. per day in divided doses, e.g, 2 to 4 times per day may be used, depending of course upon the particular compounds and the response of the patient.

The following examples are illustrative of the invention. All tempeartures are expressed in degrees centigrade.

Example 1

(a) Preparation of 2-pyridyl acetonitrile 41 gms. of 2-pyridyl methyl chloride hydrochloride (0.25 mole), 33 gms. of potassium cyanide (0.5 mole), and 3 gms. of potassium iodide are added to 250 ml. of 60% ethanol. The mixture is heated on a water bath at 45° to 50° for 9 hours with vigorous stirring. The solvent is then removed and the residue is treated with potassium carbonate then extracted with chloroform (3 x 200 ml.). This is then dried over sodium sulfate. The solvent is removed in vacuo and the residual dark oil is fractionated in a column under water vacuum. The product 2-pyridyl acetonitrile is collected in the fractions boiling between 93 and 105° as a light yellow fluid.

(b) Preparation of 4-pyridyl acetonitrile 22.5 gms. of 4-pyridyl methyl chloride hydrochloride suspended in 100 ml. of 99% ethanol and a solution of 6 gms. of sodium hydroxide in 100 ml. of alcohol are stirred together for a half hour. A mixture of 20 gms. of sodium cyanide in 10 ml. of water and 100 ml. of alcohol is then added portionwise. During the subsequent stirring for thirty hours at room temperature, the reaction mixture becomes dark red. The solvent is then distilled off in vacuo. The viscous residue is treated with 35 gm. of potassium carbonate and extracted with chloroform (4 x 150 ml.). The chloroform extracts are combined, dried and concentrated in vacuo. The residual dark red oil is distilled under vacuum. The fraction boiling between 92° and 94° contains the desired practically colorless 4-pyridyl acetonitrile which is redistilled. The cooled product has a melting point of 43°.

(c) Preparation of (6-methyl-2-pyridyl)acetonitrile 35.6 gms. of (6-methyl-2-pyridyl)methyl chloride hydrochloride (0.2 mole), are treated with 8 gms. of sodium hydroxide and 26.6 gms. of sodium cyanide (0.54 mole) in 550 ml. of ethanol and 20 ml. of water. After a reaction of 10 hours, the crude product, (6-methyl-2-pyridyl) acetonitrile, is worked up by the same procedure described in part a. The fraction boiling between 68–74° contains the desired product which crystallizes in long filamentous needles.

(d) Preparation of (2-methyl-4-thiazolyl)acetonitrile 51 gms. of dichloroacetone (0.4 mole) and 30 gms. thioacetamide (0.4 mole) are separately dissolved in the smallest possible amount of acetone and then the solutions are combined. After 48 hours, the precipitated product is isolated and dried in vacuo. This is then heated for four hours with 12 gms. of anhydrous zinc chloride and the product is then isolated by distillation. 33 gms. of the 2-methyl-4-chloromethylthiazole (0.22 mole) thus produced are dissolved in 700 ml. of ethanol and 100 ml. of water and 55 gms. of potassium cyanide are added. The reaction is heated at 35° for 4 hours with continuous stirring and then permitted to stand at room temperature for an additional 20 hours. The solvent is then distilled off, the residue treated with 50 gms. of potassium carbonate and extracted with chlorofrom (3 x 200 ml.). The combined extracts are dried with sodium sulfate and the chloroform removed by distillation. The residual dark product is distilled under vacuum. The product is redistilled and the product, (2-methyl-4-thiazolyl)acetonitrile is collected in the fraction boiling at 112° under reduced pressure.

EXAMPLE 2

*Preparation of 2,4,7-triamino-6-(3-pyridyl)pteridine*

0.1 gm. (0.004 mole) of sodium, 3.1 gms. (0.02 mole) of finely pulverized dry 2,4,6-triamino-5-nitrosopyrimidine [Chem. Ber. 37, 4544 ʌ1911)] and 2.4 gms. (0.002 mole) of 3-pyridyl acetonitrile [J.A.C.S. 73, 4925 (1951)] are dissolved in this sequence in hot glycol monethyl ether. The mixture is heated to boiling for 2 hours. The precipitate-containing dark solution is concentrated to approximately one-half volume. After cooling slowly, the dark crude product is filtered under suction, washed with methanol and ether and dried. The crude 2,4,7-triamino-6-(3-pyridyl)pteridine is then dissolved in 0.5 N hydrochloride and treated with activated carbon. The dihydrochloride crystallizes in the form of long pearly needles. Neutralization of the salt yields yellow brown prisms of the free pteridine melting at 328 to 332°.

EXAMPLE 3

*Preparation of 2,4,7-triamino-6-(2-pyridyl)pteridine*

2.4 gms. of 2-pyridyl acetonitrile, 3.1 gms. of finely pulverized dry 2,4,6-triamino-5-nitrosopyrimidine and 0.25 gm. of sodium are dissolved in hot glycol monoethyl ether and the procedure described in Example 2 is followed. The product is recrystallized from 0.5 N hydrochloric acid to obtain the hydrochloride salt. The free base is obtained by treating the salt with sodium hydroxide solution and crystallized from methanol and water. The crystalline prisms thus obtained melt at not below 350°.

EXAMPLE 4

*Preparation of 2,4,7-triamino-6-(methyl-2-pyridyl) pteridine*

By substituting 6-methyl-2-pyridyl acetonitrile in the procedure of Example 3, 2,4,7-triamino-6-(6-methyl-2-pyridyl)pteridine and its hydrochloride are obtained. The free base is recrystallized from butanol.

EXAMPLE 5

*Preparation of 2,4,7-triamino-6-(4-pyridyl)pteridine*

By substituting 4-pyridyl acetonitrile for the 2-pyridyl acetonitrile in the procedure of Example 3, 2,4,7-triamino-6-(4-pyridyl)pteridine and its hydrochloride are obtained. The hydrochloride froms yellow needles melting at about 350°.

EXAMPLE 6

*Preparation of 2,4,7-triamino-6-(2-methyl-4-triazolyl) pteridine*

The reaction of 2,4,6-triamino-5-nitrosopyrimidine with 2-methyl-4-thiazole according to the procedure of Example 2 yields 2,4,7-triamino-6-(2-methyl-4-thiazolyl) pteridine as a dark crude product which is purified chromatographically on silica gel. The crystalline prisms are recrystallized from 5% acetic acid and from methanol and melt in excess of 350°.

EXAMPLE 7

250 gms. of 2,4,7-triamino-6-(2-pyridyl)pteridine, 5 gms. of magnesium stearate and 300 gms. of lactose are screened through a 60 mesh screen. The mixture is then thoroughly admixed. The mixture is then filled into 1000 #0 hard gelatin capsulse each containing 250 mgs. of active ingredients.

EXAMPLE 8

1000 tablets are prepared by first thoroughly admixing 5 gms. of 2,4,7-triamino-6-(6-methyl-2-pyridyl)pteridine, 125 gms. of dicalcium phosphate and 25 gms. of sucrose and granulating with a 10% corn starch paste prepared from a portion of a 15 gm. batch of starch. The granulation is passed through a 12 mesh screen and dried. The granules are mixed with the remainder of the starch, 5 gms. of talc and 3 gms. of stearic acid, passed through a 60 mesh screen and compressed into tablets containing 5 mg. of active ingredient.

EXAMPLE 9

Tablets containing 2,4,7 - triamino - 6 - (2-methyl-4-thiazolyl)pteridine are prepared by substituting this compound for the 2,4,7-triamino-6-(6-methyl-2-pyridyl)pteridine in Example 8.

EXAMPLE 10

1000 tablets each containing 50 mg. of 2,4,7-triamino-6-(2-pyridyl)pteridine and 5 mg. of benzydroflumethiazide are prepared from the following ingredients according to the procedure of Example 8:

| | Gm. |
|---|---|
| 2,4,7-triamino-6-(2-pyridly)pteridine | 50 |
| Benzydroflumethiazide | 5 |
| Starch | 15 |
| Magnesium stearate | 0.75 |
| Talc | 15 |
| Lactose Qs. | 300 |

EXAMPLE 11

2,4,7-triamino-6-(6-methyl-2-pyridyl)pteridine is dissolved in isotonic saline at a concentration of 50 mg./ml. The pH is adjusted to pH 4–5 with citric acid-sodium citrate buffer.

What is claimed is:

1. A member selected from the group consisting of a compound of the formula

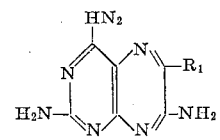

wherein $R_1$ is a member of the group consisting of pyridyl, lower alkylpyridyl, thiazolyl and lower alkylthiazolyl, and physiologically acceptable acid addition salts thereof.

2. 2,4,7-triamino-6-pyriduylpteridine.
3. 2,4,7-triamino-6-(2-pyridyl)pteridine.
4. 2,4,7-triamino-6-(lower alkylpyridyl)pteridine.
5. 2,4,7-triamino-6-(6-methyl-2-pyridyl)pteridine.
6. 2,4,7-triamino-6-thiazolylpteridine.
7. 2,4,7-triamino-6-(lower alkylthiazolyl)pteridine.
8. 2,4,7-triamino-6-(2-methyl-4-thiazolyl)pteridine.
9. 2,4,7-triamino-6-(4-pyridyl)pteridine.

References Cited by the Examiner

UNITED STATES PATENTS

| 2,889,357 | 8/1959 | Cavallito et al. | 167—65 |
| 2,967,130 | 1/1961 | Sanders et al. | 167—65 |
| 3,159,627 | 12/1964 | Pachter | 260—251.5 |
| 3,159,629 | 12/1964 | Pachter et al. | 260—251.5 |
| 3,210,356 | 10/1965 | Pachter et al. | 260—251.5 |

NICHOLAS S. RIZZO, *Primary Examiner.*

Notice of Adverse Decision in Interference

In Interference No. 95,884 involving Patent No. 3,290,312, R. Tschesche and G. Sturm, TRIAMINO PTERIDINE COMPOUNDS, final judgment adverse to the patentees was rendered Apr. 25, 1968, as to claims 1, 2, 3, 6 and 9.

[*Official Gazette July 2, 1968.*]

Disclaimer 3,290,312.—*Rudolf Tschesche*, Rottgen, near Bonn, and *Gerhard Sturm*, Ippendorf, near Bonn, Germany. TRIAMINO PTERIDINE COMPOUNDS. Patent dated Dec. 6, 1966. Disclaimer filed Sept. 10, 1968, by the assignee, *E. R. Squibb & Sons, Inc.*

Hereby enters this disclaimer to claims 1, 2, 3, 6 and 9 of said patent.

[*Official Gazette October 29, 1968.*]